May 2, 1950 E. C. ENEBECK 2,505,758
SUCTION PICKUP ROTOR FOR SEED DISPENSING MACHINES
Filed Dec. 29, 1944 4 Sheets-Sheet 1
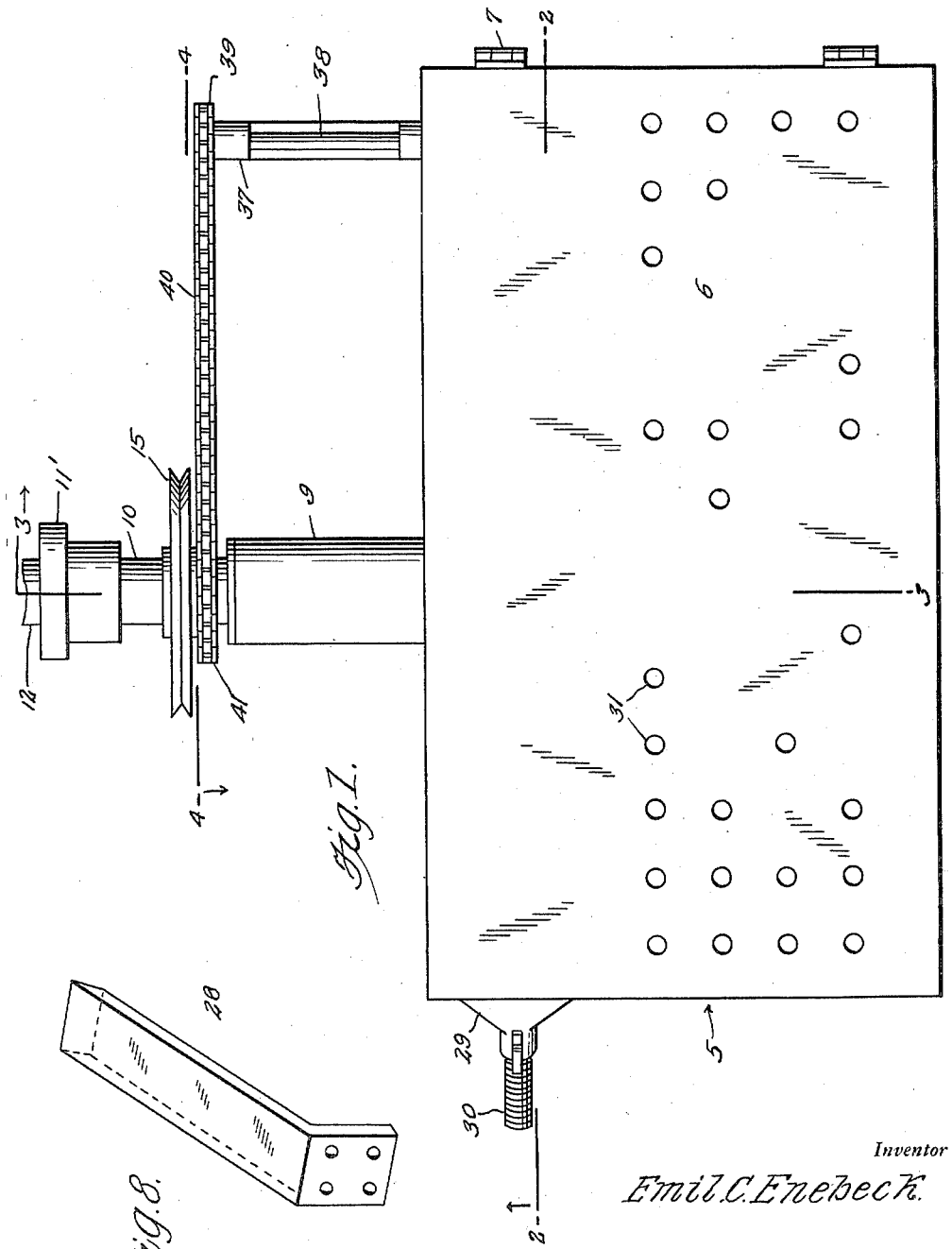
Inventor
*Emil C. Enebeck*
By *Clarence A. O'Brien
and Harvey B. Jacobson*
Attorneys

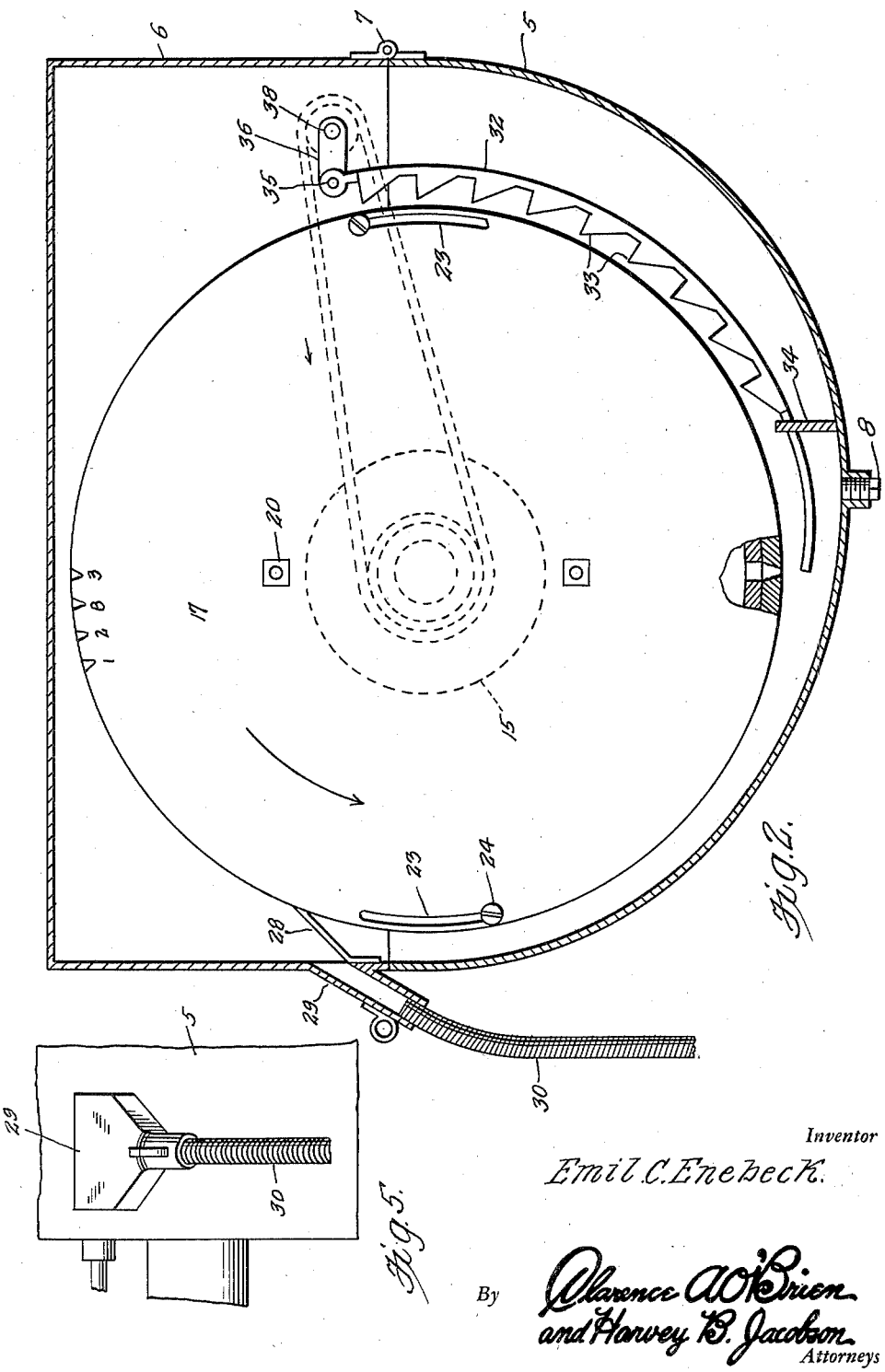

May 2, 1950     E. C. ENEBECK     2,505,758
SUCTION PICKUP ROTOR FOR SEED DISPENSING MACHINES
Filed Dec. 29, 1944     4 Sheets-Sheet 3
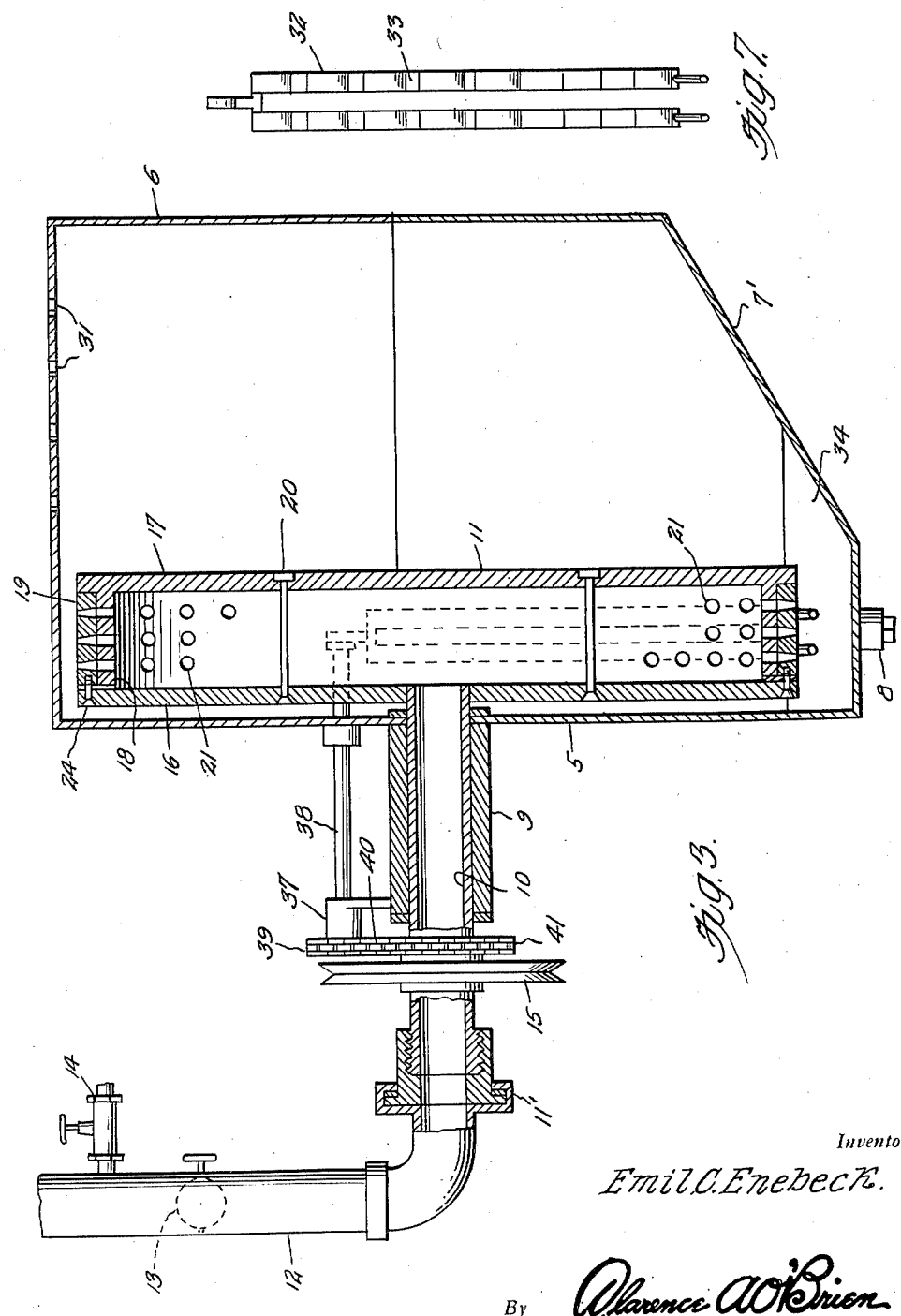
Inventor
*Emil C. Enebeck.*
By *Clarence A. O'Brien
and Harvey B. Jacobson*
Attorneys May 2, 1950 E. C. ENEBECK 2,505,758
SUCTION PICKUP ROTOR FOR SEED DISPENSING MACHINES
Filed Dec. 29, 1944 4 Sheets-Sheet 4
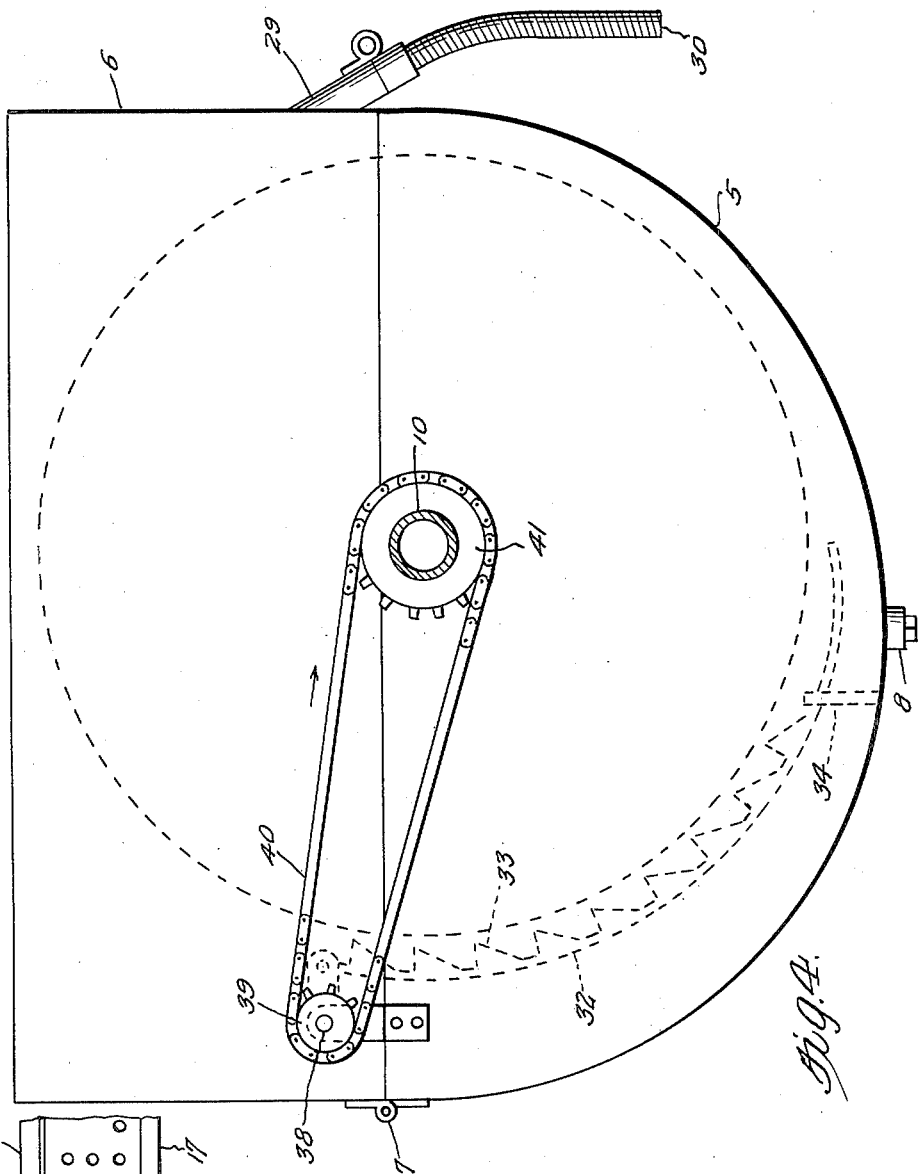
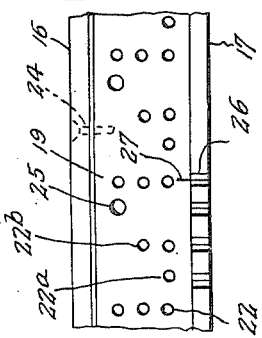
Inventor
Emil C. Enebeck.
By Clarence A. O'Brien
and Harvey B. Jacobson
Attorneys Patented May 2, 1950

2,505,758

UNITED STATES PATENT OFFICE 2,505,758

SUCTION PICKUP ROTOR FOR SEED DISPENSING MACHINES

Emil C. Enebeck, Boise, Idaho

Application December 29, 1944, Serial No. 570,401

4 Claims. (Cl. 222—11)

This invention relates to seed dispensing devices for planters, and has more particular reference to a device of this kind wherein a rotary suction wheel is employed for continuously picking up the seeds in the required number for delivery to the discharge pipe by means of which the seed are deposited in the furrow.

An important object of the present invention is to provide a dispensing device of the above kind wherein the rotary seed pick-up wheel is mounted in the seed receptacle and provided with peripheral air inlet openings so that the seeds are picked up and held to the periphery of the wheel by suction for being subsequently stripped from the periphery of the wheel and directed into the discharge pipe.

Another object of the present invention is to provide a seed dispensing device of the above kind wherein the pick-up wheel is provided with a removable and adjustable peripheral seed ring that may be adjusted to vary the number of seeds successively picked up and delivered to the discharge pipe, and adapted to be removed to permit the selective use of the desired one of a number of different seed rings having openings of different sizes so that the device may be adapted for effectively handling different kinds and sizes of seeds.

A further object is to provide means to regulate the degree of suction provided in the pick-up wheel so that the seeds picked up will be lightly but effectively held to the periphery of the wheel until stripped therefrom.

Further objects are to provide simple and efficient means for agitating the seeds in the seed receptacle so that the same may be readily picked up by the suction wheel, and to provide a simple and efficient blade for stripping the seeds from the periphery of the pick-up wheel and directing the same into the discharge pipe.

Still further objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a top plan view of a seed dispensing device constructed in accordance with the present invention.

Figure 2 is a vertical longitudinal sectional view thereof taken on line 2—2 of Figure 1.

Figure 3 is a vertical transverse section taken on line 3—3 of Figure 1.

Figure 4 is a vertical longitudinal section taken substantially on the plane of line 4—4 of Figure 1.

Figure 5 is a fragmentary front elevational view showing the outlet spout and the adjacent end of the discharge pipe.

Figure 6 is a fragmentary plan view looking at the peripheral portion of the pick-up wheel.

Figure 7 is an elevational view of the agitator, and

Figure 8 is an enlarged perspective view of the blade for stripping the seeds from the pick-up wheel and directing them to the discharge pipe.

Referring in detail to the drawings, 5 indicates a suitable seed receptacle comprising a main lower portion or section and an upper cover section 6 hinged to the main section, as at 7. The lower section of the receptacle preferably has part of its bottom wall inclined, as at 7, from one side of the receptacle toward the other. At the latter side, the receptacle is deepest, and in the bottom of this deepest portion there is provided a clean-out opening provided with a removable closure plug 8. A bearing 9 is carried by the side wall of receptacle 5 at the side of the latter which is deeper, and journaled in the bearing, as well as projecting inwardly through the adjacent side of the receptacle 5, is a hollow or tubular shaft 10 having a hollow disc-like rotary seed pick-up wheel 11 secured on the end thereof within the receptacle 5 adjacent the side wall of said receptacle 5 which carries the bearing 9. A swivel connection 11' is provided between the outer end of the shaft 10 and the adjacent end of a suction pipe 12 that leads to a suction fan or blower, not shown. A suitable damper 13 is provided in the pipe 12 to regulate the volume of air drawn through said pipe. Also, the pipe 12 has a bleeder valve 14 that opens to the atmosphere and by means of which additional air may be admitted to the pipe 12 to regulate the suction which maintains in said pipe 12. Secured on the shaft 10 is a pulley 15, or the like, by means of which power may be transmitted to said shaft 10 for driving the later and the rotary pick-up wheel 11.

The pick-up wheel 11 comprises two sections 16 and 17 having marginal lateral annular flanges 18 and 19 that telescope one within the other, said sections being detachably secured together by suitable means, as at 20. The inner flange 18 of the section 17 is provided with a circular series of uniformly spaced and uniform transverse rows of apertures 21, and the flange 19 of the section 16 is provided with similar rows of apertures, as at 22. In addition, the flange 19 has additional rows of apertures 22a and 22b between the rows of apertures 22, the number of apertures in the rows 22a and 22b being different and lesser than those in the rows 22. For example, the row 22a consists of one aperture, that at 22b of two apertures, and those at 22 three apertures. The flange 19 is rotatable relative to the circular wall of the section 16 which carries the same, as well as being detachable from said circular wall. For this purpose, the circular wall of section 16 may be provided with arcuate slots, as at 23, and screws 24 are passed through these slots and threaded into the flange 19 to secured the latter in place. By loosening the screws 24, the flange 19 may be rotatably adjusted relative to its disc-like carrying wall, whereby any desired row of apertures of the flange 19 may be registered with the rows of apertures 21 of the flange 18. For instance, when the rows 22 are registered with the rows 21, the wheel is set to pick up three seeds at a time in each row. On the other hand, by further adjustment of the flange 19, apertures 22a may be registered with one aperture of each row 21 so that the seeds are picked up one at a time. If rows 22b are registered with two apertures of each row 21, the wheel will pick up two seeds at a time. In addition, the flange 19 may be provided with additional large apertures 25 between the rows 22 and 22b so as to adapt this seed ring or flange 19 for picking up larger seeds one at a time when the apertures 25 are registered respectively with one aperture 21 of each row provided in the flange 18. Obviously, the apertures will be slightly smaller than the seeds being planted, and the flange 19 may be removed and interchangeably used with different seed rings having openings of different sizes to take care of the many different types of seeds that may be planted. Removal of screws 24 permits this detachment of the seed ring or flange 19, and the proper seed ring will enable the seeds to be picked up by suction so that they will be effectively held to the periphery of the pick-up wheel, one for each aperture of ring 19 that is registered with an aperture 21 of flange 18. At the same time, the seeds will not materially project into the apertures of the ring or flange 19, so that they may be readily stripped or scraped from the periphery of the wheel 11 at the proper time for discharge from the receptacle 5. To facilitate the adjustment of ring or flange 19, relative to the section 17, the latter is provided with a plurality of peripheral notches 26 arranged to coact with an indicator mark 27 provided on the ring or flange 19. The arrangement is such that when the mark 27 is registered with one notch 26, the wheel is set to deliver three seeds at a time because the rows of apertures 22 are registered with the apertures 21. The second notch will register with the mark 27 when the wheel is set to deliver seeds one at a time, or when the apertures 22a are registered with one aperture of each row 21. When the mark 27 aligns with the third notch 26, the wheel will pick up two seeds at a time because the apertures 22b are then registered with certain of the openings 21. Mark 27 registers with the fourth notch 26 when an opening 21 of each row is registered with one large opening 25, the wheel being then adapted for planting larger seeds one at a time.

As the pick-up wheel 11 rotates, the seeds are stripped from the periphery of said wheel at the upper portion of the receptacle 5 by means of an inclined stripper blade 28 that extends downwardly from the wheel to a discharge spout 29 provided on the receptacle section 6. The spout 29 is inclined outwardly and downwardly and communicates with a discharge pipe 30 which is attached thereto and is adapted to lead into a point in proximity to the ground for depositing the seeds in the furrow. The inclined blade 28 strips the seeds from the periphery of the pick-up wheel and directs the same outwardly and downwardly into spout 29, from which the seeds pass by gravity to and through the pipe 30.

It will thus be seen that the present dispensing device provides for the deposit of any selected number of seeds at regular intervals. Because of the constant exhaustion of air from the receptacle 5 due to the suction within the wheel 11, the top of the receptacle may be provided with air inlet openings, as at 31.

It is desirable and often necessary to constantly agitate the seeds in the lower portion of the receptacle 5 so that they will properly feed to and will be properly picked up by the wheel 11. For this purpose, a longitudinally curved agitating fork 32 is mounted adjacent to and substantially concentric with a lower portion of the wheel 11, said fork having a longitudinal series of teeth 33 on the inner or upper surfaces of the prongs thereof. The lower ends of the prongs of agitator 32 are slidably disposed in slots of a guide 34, and said agitator is given a longitudinal sliding and vertical swinging movement by operatively connecting the other end of the same, as at 35, to a crank 36 driven from the shaft 10. The bearing 9 supports a secondary bearing 37 in which is journaled a shaft 38 that projects into the receptacle 5 and has the crank 36 secured on the end thereof within said receptacle. The outer end of shaft 38 carries a sprocket wheel 39, and an endless sprocket chain 40 passes around the sprocket wheel 39 as well as around another sprocket wheel 41 secured on the shaft 10. Thus, as the pick-up wheel is driven, the agitator is also driven to keep the seeds loose and insure proper action of the pick-up wheel. The seeds are introduced into the lower section of the receptacle 5 when the cover section 6 is opened, and any suitable provision may be made to facilitate removal of the chain 40 when opening of the receptacle is desired. Dirt and other foreign matter or seeds not used may be readily drain from the receptacle through the clean-out opening closed by the plug 8.

From the foregoing description, it is believed that the construction and operation, as well as the advantages of the present invention, will be readily understood and appreciated by those skilled in the art. It will be apparent that the device is convenient to use and comparatively simple and durable in construction. The seeds are effectively picked up by the action of suction and then readily stripped from the periphery of the pick-up wheel for discharge into the furrow. Minor changes in details of construction illustrated and described may be made, such as fall within the spirit and scope of the invention as claimed.

What I claim is:

1. A suction pick-up wheel for seed dispensing devices comprising two sections having lateral annular marginal flanges, one telescoping within the other, means to separably connect said sections, the inner flange having uniformly spaced rows of uniform openings therein, the outer flange being rotatable relative to its carrying wall for adjustment relative to the inner flange and having openings arranged in transverse rows with the number of openings in the rows varying so that desired ones of the openings in the inner flange may be uncovered for varying the number of seeds picked up at a time by the wheel.

2. A suction pick-up wheel for seed dispensing devices comprising two sections having lateral annular marginal flanges, one telescoping within the other, means to separably connect said sections, the inner flange having uniformly spaced rows of uniform openings therein, the outer flange being rotatable relative to its carrying wall for adjustment relative to the inner flange and having openings arranged in transverse rows with the number of openings in the rows varying so that desired ones of the openings in the inner flange may be uncovered for varying the number of seeds picked up at a time by the wheel, means to facilitate accurate adjustment of the rotary flange relative to the inner flange, and means to secure said rotary flange in adjusted position.

3. A hollow disk-like suction pickup wheel for seed dispensing devices comprising two sections, each including a circular wall having a lateral annular marginal flange, the flange of one circular wall telescoping with the flange of the other circular wall, the inner flange having uniformly spaced rows of uniform openings therein, the outer flange being rotatably adjustable relative to the inner flange and having openings arranged in transverse rows with the number of openings in the rows varying so that desired ones of the openings in the inner flange may be uncovered for varying the number of seeds picked up at a time by the wheel.

4. In a seed dispensing device, a stationary seed receptacle, a rotatable tubular shaft journaled in one side of said receptacle and having means at its outer end to connect the same to a suction pipe, a suction pickup wheel arranged within said receptacle and secured on the inner end of said shaft, said pickup wheel being in the form of a hollow disk and comprising two sections, each including a circular wall having a lateral annular marginal flange, the flange of one circular wall telescoping within the flange of the other circular wall, the inner flange having uniformly spaced rows of uniform openings therein, the outer flange being rotatably adjustable relative to the inner flange and having openings arranged in transverse rows with the number of openings in the rows varying so that desired ones of the openings in the inner flange may be uncovered for varying the number of seeds picked up at a time by the wheel, said shaft being attached to and opening through the center of one circular wall, and means for rotatably driving said shaft.

EMIL C. ENEBECK.

REFERENCES CITED

The following references are of record in the file of this patent:

UNITED STATES PATENTS

| Number | Name | Date |
|---|---|---|
| 1,006,984 | Sheetz | Oct. 24, 1911 |
| 1,371,517 | Oliver | Mar. 15, 1921 |
| 1,637,834 | Oliver | Aug. 2, 1927 |
| 2,152,758 | Cox | Apr. 4, 1939 |
| 2,183,606 | Day | Dec. 19, 1939 |
| 2,384,820 | Dodwell | Sept. 18, 1945 |